Figure 1:
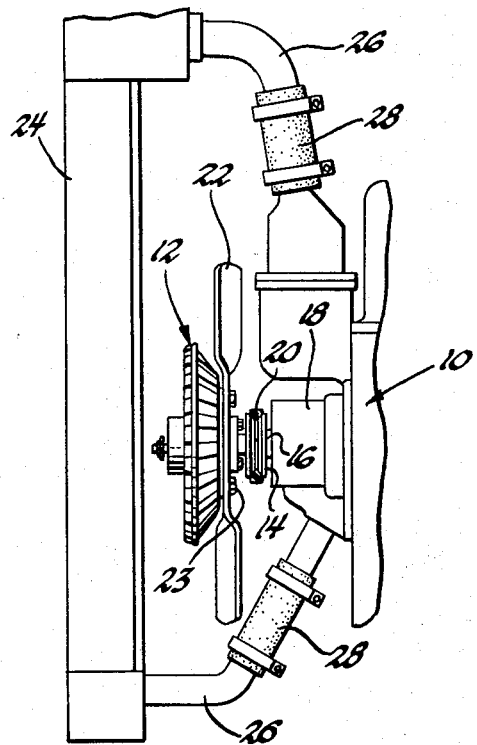

United States Patent [19]

Budinski

[11] 4,271,945
[45] Jun. 9, 1981

[54] ELECTRICALLY ACTUATED VISCOUS FAN CLUTCH

[75] Inventor: John A. Budinski, Dayton, Ohio

[73] Assignee: General Motors Corporation, Detroit, Mich.

[21] Appl. No.: 912,426

[22] Filed: Jun. 5, 1978

[51] Int. Cl.³ .......................................... F16D 35/00
[52] U.S. Cl. .............................. 192/58 B; 192/82 T; 236/73
[58] Field of Search ............... 192/82 T, 84 C, 58 B, 192/90; 236/73, 35

[56] References Cited

U.S. PATENT DOCUMENTS

| | | | |
|---|---|---|---|
| 899,088 | 9/1908 | Weichelt | 192/90 X |
| 2,539,547 | 1/1951 | Mossman et al. | 335/255 X |
| 2,807,688 | 9/1957 | Fischer et al. | 335/255 X |
| 3,250,355 | 5/1966 | Weir | 192/58 B |
| 3,304,000 | 2/1967 | Mobius | 236/35 |
| 3,757,914 | 9/1973 | Elmer | 192/58 B X |
| 4,036,339 | 7/1977 | Kikuchi | 192/82 T X |
| 4,056,178 | 11/1977 | Detty | 192/58 B |
| 4,060,158 | 11/1977 | Kikuchi | 192/82 T |
| 4,108,424 | 8/1978 | Rizzo | 192/82 T X |
| 4,111,289 | 9/1978 | Brummett | 192/82 T X |

Primary Examiner—Rodney H. Bonck
Attorney, Agent, or Firm—Charles R. White

[57] ABSTRACT

This fan clutch has an external stationary electromagnet energized in response to cooling signal to axially move an armature operatively connected to a valve member that controls the circulation of fluid into a rotatable viscous clutch. With the fluid circulating, the fan blading is hydraulically driven to draw cooling air through the vehicle radiator. When fan operation is no longer required, the electromagnet is automatically deenergized so that an internal spring moves the valve member to a closed position to terminate the supply of viscous fluid to the clutch to increase clutch slippage and establish the disengaged mode of clutch operation.

2 Claims, 2 Drawing Figures

U.S. Patent
Jun. 9, 1981
4,271,945

ELECTRICALLY ACTUATED VISCOUS FAN CLUTCH

This invention relates generally to viscous fluid clutches and, more particularly, to viscous fluid clutches which are actuated by a magnetic field in response to temperature changes in a sensed medium.

Viscous fluid clutches have received wide acceptance in the automobile industry for driving engine cooling fans. The most common form of such viscous fluid clutches is the air temperature response type, such as that illustrated in Coty U.S. Pat. No. 3,584,716, wherein a bimetallic thermostatic valve control element senses ambient air temperature. In certain applications, however, it may be desirable to sense directly the water temperature in the radiator rather than temperature of the air passing through the radiator. To date, many arrangements have been proposed to accomplish this result. These arrangements, however, have made use of wet or dry plate clutches that are pneumatically actuated or electromagnetic clutches that are electrically actuated, but generally the advantages achieved through the use of a viscous fluid have not been applied. Two prior art couplings which have used combined electromagnetic and viscous fluid means are Weir U.S. Pat. No. 3,250,355, FIG. 4, and Detty U.S. Pat. No. 4,056,178.

Accordingly, an object of this invention is to provide an improved viscous fluid clutch arrangement including an electromagnetic mechanism that directly senses either the water temperature of the radiator or the air conditioning system tank pressure.

Another object of the invention is to provide an improved viscous fluid clutch including electromagnetic means for moving a valve arm of the clutch upon actuation of a magnetic field from a position in which the fluid reservoir chamber of the clutch is in direct communication with the operating chamber via an inlet opening, to a position in which such communication is blocked. As is well known, the blockings of such communication and the maintenance of a continuous flow of a viscous fluid medium out of the operating chamber via a pumping operation results in the operating chamber being emptied of the viscous fluid. Without fluid in the operating chamber the torque transfer between the clutch plate of the clutch and the fan supporting housing is substantially eliminated. By unblocking the communication, the viscous fluid is permitted to flow via the inlet opening into the operating chamber from the storage chamber at a rate faster than the rate of flow of fluid via the pumping operation from the operating chamber to the storage chamber. This allows for a transfer of torque from the clutch plate to the fan supporting housing via the viscous fluid. The valve arm of the present invention is axially moved in response to movement of an armature which, in turn, is moved through a solenoid action upon energization of a coil.

A further object of the invention is to provide such a viscous fluid clutch having electromagnetic actuating means wherein a stationary electromagnetic assembly is mounted on bearings on the rotatable cover member of the clutch housing and includes a coil housing, an energizable electromagnetic coil mounted in the housing, a shaft slidably and rotatably mounted along the axis of the coil and extending through an opening formed in the cover member into the reservoir chamber of the clutch, and an armature secured to the shaft within the coil housing adjacent the coil. The usual valve member of the clutch is secured to the end of the shaft for axial movement therewith away from the inlet port upon energization of the coil, and a coil spring mounted in the reservoir chamber for urging the valve member toward the divider plate to close the inlet port upon deenergization of the coil.

Figure 2:
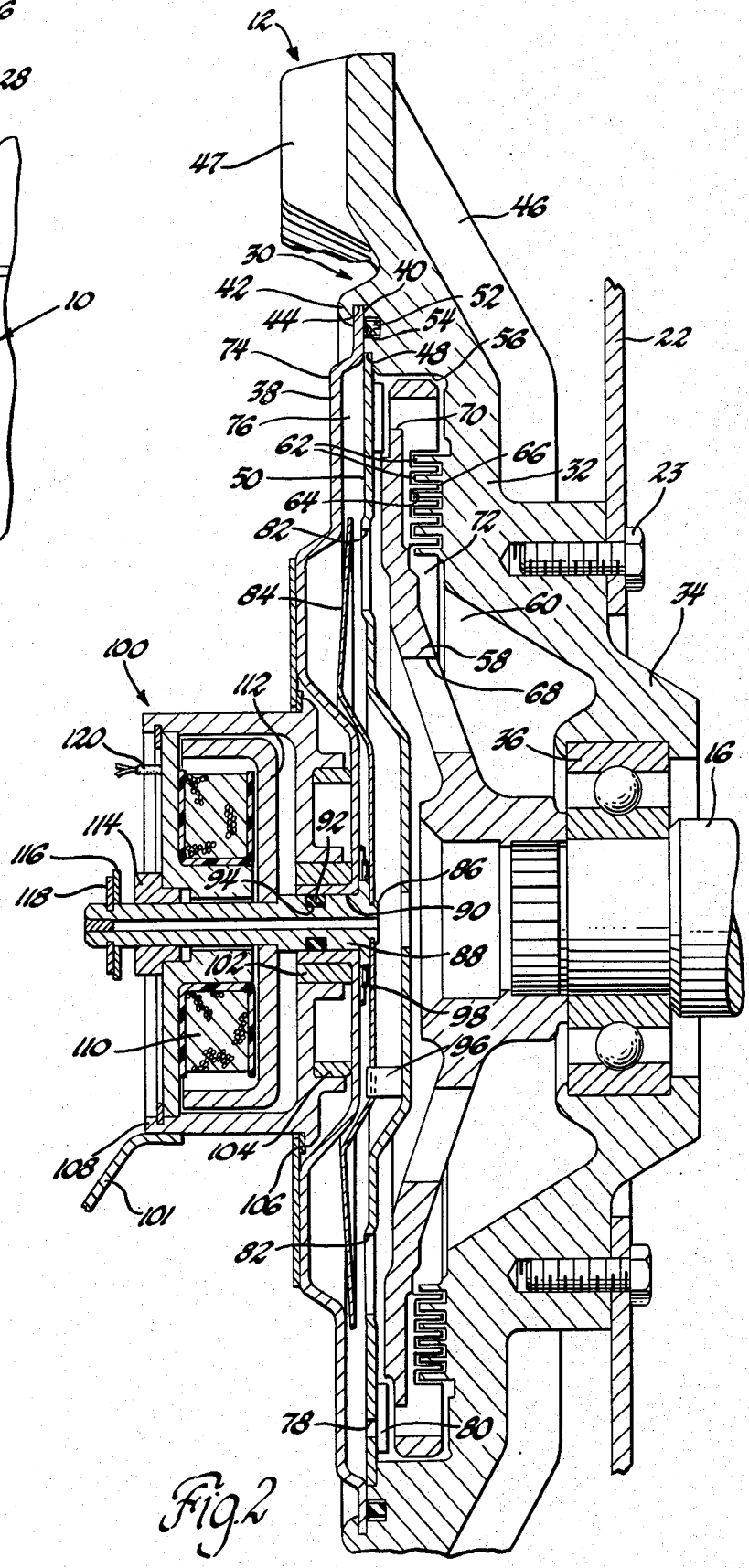

These and other objects and advantages of the invention will become more apparent when reference is made to the following description and accompanying drawings, wherein:

FIG. 1 is a fragmentary side elevational view of a radiator and engine having a viscous fluid clutch-driven cooling fan associated therewith; and FIG. 2 is an enlarged fragmentary cross-sectional view of the viscous fluid clutch of FIG. 1 which embodies the invention.

Referring to the drawings in greater detail, Figure illustrates an engine 10 having a viscous fluid clutch 12 and a pulley 14 mounted on a drive shaft 16 extending from the conventional water pump 18, the pulley 14 being rotated by a V-belt 20 connected to the crankshaft (not shown) for driving a cooling fan 22 secured by bolts 23 to a mounting surface formed on the clutch 12. The clutch 12 and the cooling fan 22 are located between the engine 10 and a radiator 24. The usual conduits 26 and associated hoses 28 communicate between the radiator 24 and the engine 10 adjacent the water pump 18.

Referring now to FIG. 2, the fluid clutch 12 includes an output member which consists of a casing or housing 30 including a rear wall member 32 having a hub 34 which is rotatably mounted by a suitable bearing 36 on the drive shaft 16. The housing 30 further includes a cover or front wall member 38 which has an annular flat surface 40 formed adjacent its peripheral edge, the latter being confined by an annular lip 42 in an annular recess 44 formed in the housing 30. Cooling fins 46 and 47 are formed on the outer surfaces of the rear wall member 32 and adjacent the cover member 38, respectively. A second annular recess 48 is formed in the rear wall member 32 radially inward of the outer periphery of the first annular recess 44. A divider wall or pump plate 50 is mounted with its outer edge extending into the recess 48 intermediate the cover member 38 and the rear wall member 32. A seal 52 is compressed by the flat surface 40 of the cover member 38 in an annular groove 54 formed in the rear wall member 32 intermediate the outer edges of the annular recesses 44 and 48. A third annular deeper recess 56 is formed in the rear wall member 32 radially inward of the second annular recess 48. A clutch plate 58 is secured at its center by any suitable means to the drive shaft 16, the outer peripheral portion thereof being freely located in an operating or working chamber 60 formed by the third annular recess 56.

Adjacent portions of the clutch plate 58 and the rear wall member 32 are provided with torque-transmitting elements consisting of cooperating annular ridge and groove elements 62 and 64, respectively, with an intervening fluid shear space 66 therebetween to accommodate a suitable viscous fluid, such as silicone, as a torque-transmitting medium.

The clutch plate 58 further includes a plurality of equispaced openings 68 formed therein at a point radially inward from the ridge and groove elements 62 and 64. One or more oppositely disposed smaller openings 70 are formed in the clutch plate 58 adjacent the outermost edge thereof. A pair of radial grooves, such as V-shaped grooves 72, are formed in the clutch plate 58 across the ridges 62 and terminating at the openings 68. The grooves 72 assist in the processes of filling and removing the fluid medium operative in the working chamber 60.

The front wall or cover member 38 includes a contoured portion 74 intermediate the center and peripheral edge thereof which forms an annular reservoir chamber 76 with the pump plate 50. One or more pump outlet openings 78 are formed through the pump plate 50 circumferentially adjacent pump or dam elements 80 formed on the pump plate 50, the opening 78 communicating between the working chamber 60 and the reservoir chamber 76. The pump element 80 may consist of a circular boss formed on the pump plate 50 by any suitable means, such as stamping, or it may be a rectangular-shaped or other-shaped member secured to the pump plate 50, such as by welding. In some applications one outlet and one pump element may be sufficient, while other applications may require two such pumping arrangements.

One or more inlet ports 82 (FIG. 2) are also formed in the pump plate 50, communicating between the reservoir chamber 76 and the operating chamber 60 radially inward of the pump elements 80 and the pump outlet openings 78.

The inlet ports 82 are at times closed off by a valve member 84, which is moveable in response to temperature changes in a manner to be described. The valve member 84 is illustrated as being secured in any suitable manner to a reduced diameter portion 86 of a central pin or shaft 88, which is rotatably mounted in a central opening 90 formed in the front wall or cover member 38. A seal ring 92 is mounted in an annular groove 94 formed in the shaft 88 within the central opening 90 to prevent leakage therepast. A retainer bracket 96 is formed on the divider wall 50 and extends axially therefrom so as to have an abutting relationship with an edge portion of the valve member 84, causing the latter to rotate with the divider wall 50. A spring 98 is mounted between the valve member 84 and the inner surface of the cover member 38 in the reservoir chamber 76, urging the valve member into a closed position against the inlet ports 82.

A stationary electromagnetic assembly 100 is mounted exteriorally of the housing 30, retained in place adjacent the cover member 38 by a strap or bracket 101. The assembly 100 is mounted around the shaft 88 and cooperates therewith for controlling the opening and closing of the inlet ports 82 by the valve member 84 in a manner to be described. The electromagnetic assembly 100 includes first, second and third sets of concentric bearings 102, 104 and 106, respectively, mounted on the rotatable cover member 38 for supporting stationary housing 108 having an electromagnetic coil 110 mounted therein concentric with the shaft 88. An armature 112 is secured to the shaft 88 adjacent the electromagnetic coil 110 for reciprocal movement within the housing 108. An additional bearing 114 is mounted around the shaft and within the outer wall of the coil housing 108 for axially aligning the shaft 88 through the housing. Still another bearing 116 is mounted around the shaft 88 and retained thereon by a retainer ring 118 secured to the shaft 88, for engagement with the bearing 114 when the inlet ports 82 are closed. The spacing of the bearing 114 on the shaft 88 relative to the bearing 116 is such that the armature 112 is retained a predetermined narrow gap away from the end wall of the housing 108 when the inlet ports 82 are closed by the valve member 84. Wire leads 120 are connected between the electromagnetic coil 110 and a suitable sensor mechanism (not shown) which senses air conditioning compressor freon pressure and/or radiator coolant temperature.

As is well known to those skilled in the fluid clutch art, upon rotation of the clutch plate 58 by the input shaft 16, via the pulley 14, torque is transmitted to the adjacent housing or output member 30 by the shear action of the fluid medium in the operating chamber 60. Rotation of the housing 30 effects rotation of the cooling fan 22 secured thereto, the speed thereof being influenced by the shear drive of the variable volume of fluid medium in the chamber 60.

The chamber 60 is substantially emptied by virtue of the fluid medium being pumped through the continuously open pump outlet opening 78 by the action of the pump element 80 serving as a dam or wiper, forcing the fluid to flow into the openings 78 and, thence, into the annular reservoir chamber 76. Under this condition, commonly known as the "disengaged mode", the slip between the clutch plate 58 and the housing 30 is greatest, and fan 22 speed is correspondingly low.

Once either the radiator coolant temperature or the compressor freon pressure increases to a predetermined level, the electromagnetic coil 110 is energized, attracting the armature 112 toward the coil but remaining a predetermined narrow gap away therefrom when the spring 98 is fully compressed after moving the shaft 88 and valve member 84 outwardly, or to the left in FIG. 2, to complete the opening of the inlet ports 82. This permits the fluid to flow from the reservoir chamber 76 through the inlet ports 82 back into the operating chamber 60 until the annular levels in both the operating chamber and reservoir chamber are at the same level, at which time the housing 30 and, hence, the fan 22, rotate at minimal slip-speed with respect to the clutch plate 58, thereby affecting a so-called "engaged mode" or maximum cooling function.

So long as the inlet ports 82 in the divider wall 50 remain open, a fluid circulation process will prevail, i.e., the rotating pump or dam elements 80 will continue to promote the flow of fluid from the operating chamber 60, through the pump outlet openings 78, into the reservoir chamber 76, from whence it will return to the operating chamber 60 via the open inlet ports 82.

It should be apparent that the invention provides an improved electromagnetically actuated viscous fluid clutch which reacts directly to radiator coolant temperature or air conditioning system tank pressure for rapid and reliable response to cooling needs, with low power requirements, permitting the device to be small, lightweight and economical.

While but one embodiment of the invention has been shown and described, other modifications thereof are possible.

The embodiments of the invention in which an exclusive property or privilege is claimed are defined as follows:

1. In a viscous fluid clutch including a rotatable drive shaft, driven means including a rotatable outer casing and a divider plate mounted in said casing for rotation therewith, said divider plate separating the space within said casing into a fluid reservoir chamber and an operating chamber, a clutch plate mounted on said shaft within said operating chamber for rotation with said drive shaft, opposed shear surfaces on said clutch plate and said casing disposed in close face-to-face and spaced relationship, inlet and outlet ports formed in said divider plate, pump means carried by said divider plate and in said operating chamber for displacing a fluid medium from said operating chamber through said outlet port to said reservoir chamber, and a valve member operatively connected to said divider plate for rotation therewith for opening and closing said inlet port and thereby effecting selective communication of said fluid medium from said reservoir chamber to said operating chamber for filling the spaces between said shear surfaces to create a fluid drive coupling between said casing and said clutch plate, the improvement comprising electromagnetic means mounted exteriorly of said casing for controlling the opening and closing of said inlet port by said valve member, said electromagnetic means including bearing means mounted on said casing, a stationary electromagnetic coil housing mounted on said bearing means, an electrically energizable electromagnetic coil mounted in said coil housing, a shaft slidably and rotatably mounted relative to said coil along the axis of said coil and coil housing and extending through an opening formed in said casing into said reservoir chamber, an armature secured to said shaft movably mounted within said coil housing adjacent said coil for longitudinally sliding said shaft when said coil is energized, said valve member being directly and non-rotatably secured to the end of said shaft for axial movement therewith away from said inlet port upon energization of said coil, and spring means operatively connected to said valve member for urging said valve member toward said divider plate to close said inlet port upon deenergization of said coil.

2. In a viscous fluid clutch including a rotatable drive shaft, a rotatable housing including a cover member said a divider wall mounted in said housing for rotation therwith, said divider wall separating the space within said housing into a fluid reservoir chamber and an operating chamber, a clutch plate operatively mounted on said shaft within said operating chamber, opposed shear surfaces formed on said clutch plate and on an inner wall surface of said housing and disposed in close face-to-face and spaced relationship, inlet and outlet ports formed in said divider wall, pump means in said operating chamber for displacing a fluid medium from said operating chamber through said output port to said reservoir chamber, and a valve member operatively connected to said divider wall for rotation therewith for effecting selective communication of said fluid medium from said reservoir chamber to said operating chamber for filling the spaces between said shear surfaces to create a fluid drive coupling between said housing and said clutch plate, the improvement comprising electromagnetic means mounted exteriorly of said housing for controlling the opening and closing of said inlet port by said valve member, said electromagnetic means including bearing means mounted on said housing a stationary electromagnetic coil housing mounted on said bearing means, an electrically energizable electromagnetic coil fixed in said stationary coil housing, a longitudinally slidable shaft rotatably mounted relative to said coil along the axis of said coil and coil housing and extending through an opening formed in said casing into said reservoir chamber, an armature secured to said shaft and movably mounted within said coil housing adjacent said coil, said valve member being non-rotatably secured to the end of said shaft for axial movement therewith away from said inlet port upon energization of said coil, retainer means formed on said divider wall for causing said valve member to rotate therewith, and spring means mounted in said reservoir chamber between said valve member and said cover member for urging said valve member toward said divider wall to close said inlet port upon deenergization of said coil.

* * * * *

UNITED STATES PATENT AND TRADEMARK OFFICE
CERTIFICATE OF CORRECTION

PATENT NO. : 4,271,945
DATED : June 9, 1981
INVENTOR(S) : John A. Budinski

It is certified that error appears in the above-identified patent and that said Letters Patent are hereby corrected as shown below:

Column 5, line 35 after "member" delete "said" and insert -- and -- .

Column 5, line 37 "therwith" should read -- therewith -- .

Signed and Sealed this

Twenty-second Day of September 1981

[SEAL]

Attest:

GERALD J. MOSSINGHOFF

Attesting Officer

Commissioner of Patents and Trademarks